July 23, 1940.  R. W. SHANNON  2,208,704
BASE AND MOUNTING MEANS
Filed Oct. 4, 1937  3 Sheets-Sheet 1

Inventor
R. W. Shannon
By Bacon + Thomas
Attorneys

July 23, 1940.          R. W. SHANNON                2,208,704
                     BASE AND MOUNTING MEANS
                      Filed Oct. 4, 1937          3 Sheets-Sheet 2
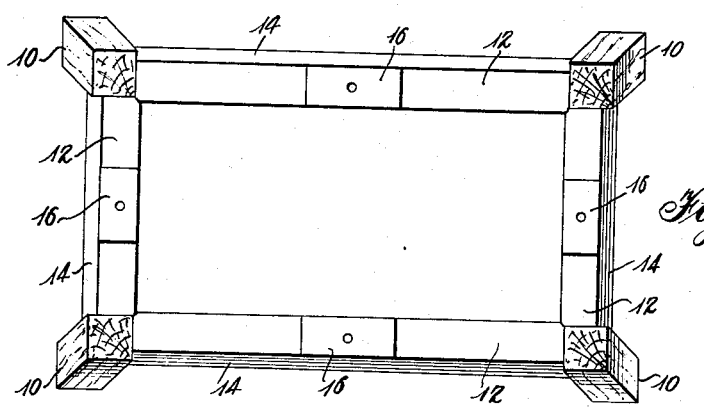
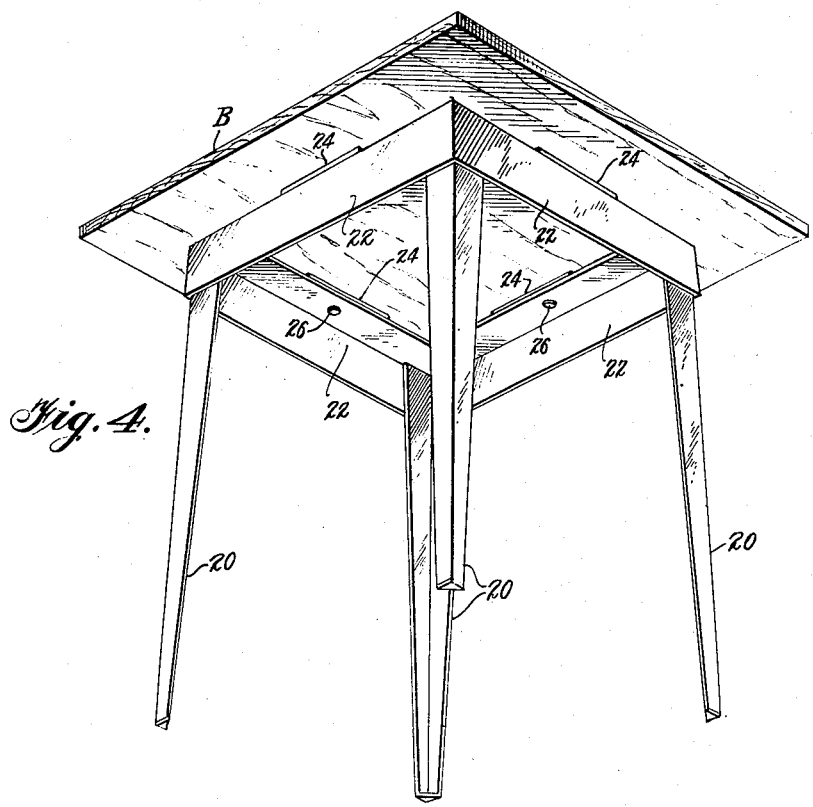
Inventor
R. W. Shannon
By Bacon & Thomas
Attorneys July 23, 1940.  R. W. SHANNON  2,208,704
BASE AND MOUNTING MEANS
Filed Oct. 4, 1937  3 Sheets-Sheet 3
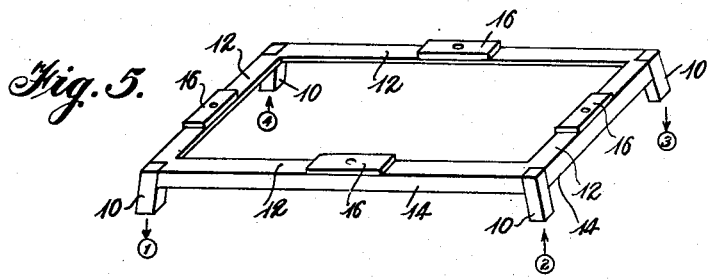
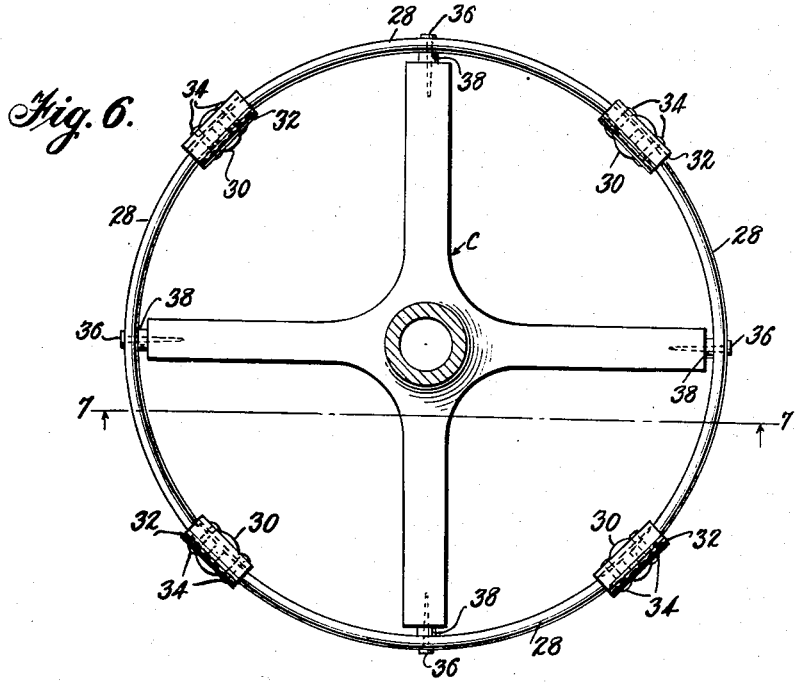
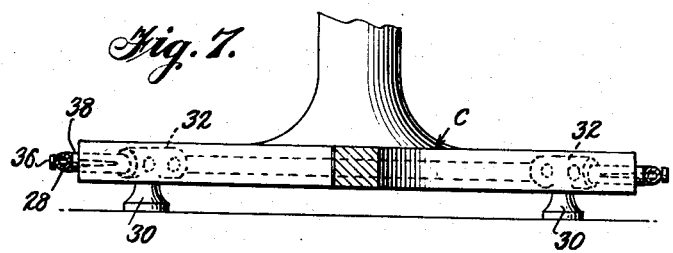
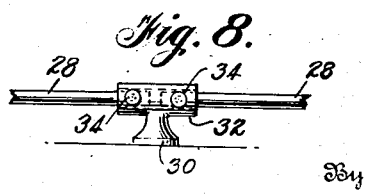
Inventor
R. W. Shannon
By Bacon & Thomas
Attorneys Patented July 23, 1940

2,208,704

UNITED STATES PATENT OFFICE 2,208,704

BASE AND MOUNTING MEANS

Randolph W. Shannon, Philadelphia, Pa.

Application October 4, 1937, Serial No. 167,320

8 Claims. (Cl. 248—194)

This invention relates to improvements in bases or pedestals upon which objects of any suitable character may be mounted and includes means for mounting such objects thereon.

An object of the invention is to provide a base or pedestal, having depending legs, which is so arranged that irregularities in the floor upon which it is placed may be compensated for by relative movement of the legs whereby the object mounted upon the base may be maintained in the desired normal position notwithstanding the fact that the legs of the base may be resting in different horizontal planes.

A further object of the invention is to provide novel means for mounting an object upon a base of the character above described whereby the necessary vertical movement of the legs may be permitted while the object remains in a substantially stationary position. The principles of the invention may be applied to supporting legs of any character, such as the elongated legs of a table or the relatively short legs for certain heavy articles of furniture or the like. Nor are the principles of the invention limited to supported objects of any specific character, and among the type of objects to which the invention has been found particularly applicable may be mentioned table tops, cabinets of various kinds, such as radio cabinets, and other articles of furniture, such as chiffoniers, chests of drawers, and the like.

Another object of the invention is to provide bases having novel associations of legs and braces therefor, whereby the necessary compensation for irregularities in a floor surface may be effected.

A further object of the invention, in addition to those which will be apparent from the following detailed description, is to provide a base and object mounting means therefor which will function to fulfill the principal objects above outlined and which are simple in construction and durable in use.

In the accompanying drawings wherein preferred embodiments of the principles of the invention have been selected for exemplification:

Figure 3 is a top plan view of the base and mounting means with the supported object removed therefrom;

Figure 4 is a perspective view of another form of base and object mounting means of the invention as applied to a table top;

Figure 5 is a perspective view of a base embodying the principles of the present invention and illustrating its operation;

Figure 6 is a plan view of another form of base and mounting means as applied to still another type of supported object which is incompletely shown;

Figure 7 is a view taken along line 7—7 of Fig. 6; and

Figure 8 is a detailed view in side elevation of a portion of the base shown in Figs. 7 and 8.

Figure 1:
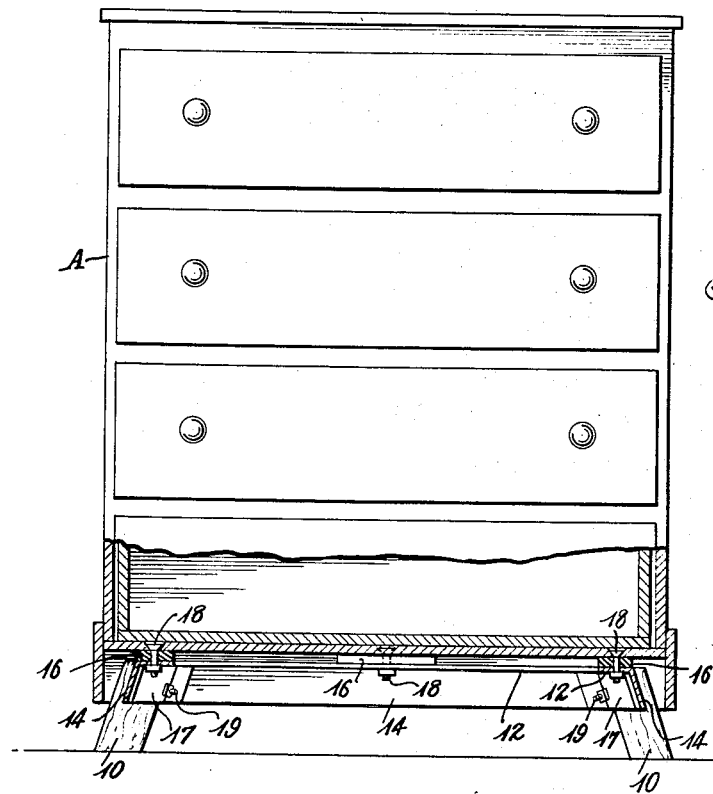
Figure 1 is an elevational view partly in section of a chiffonier or chest of drawers equipped with one form of the novel base and mounting means of the invention, with the section of the base and mounting means being taken along the line 1—1 of Fig. 2 looking in the direction of the arrows.

It will be understood that the chiffonier A, table top B, and standard indicated at C illustrated in the drawings, are exemplary only of a great variety of specific objects with which the base and mounting means of the invention may be used, and the term "supported object" or the like hereinafter appearing is used generically to indicate devices of a great variety of different specific characters with which it may be desirable to use a base and mounting means comprehended by the present invention.

Figure 2:
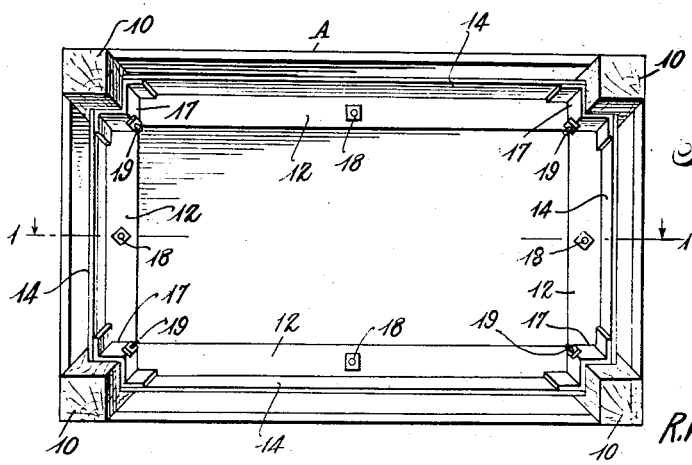
Figure 2 is a bottom plan view of the construction shown in Fig. 1.

Referring more particularly to the drawings, the base illustrated in Figs. 1, 2 and 3, which has been found particularly adapted for use with objects such as a chiffonier or a chest of drawers indicated at A, comprises a plurality of legs 10 which in this instance are formed of any suitable sturdy and solid material, such as wood. The legs 10 are interconnected at their upper ends by means of braces 12 of strips of sheet metal which may be provided with depending flanges 14 to impart further strength to the structure. The legs 10 are secured to the braces 12 by means of angle irons 17 and bolts 19. The braces 12 preferably possess a limited degree of flexibility which does not materially impair the necessary strength and stability of the base. It will be noted that the sole means for interconnecting the legs 10 is the braces 12 at the upper ends thereof whereby relative vertical movement of the legs is restricted only by the braces 12 and the necessity for flexibility in these interconnecting braces 12 is for the purpose of permitting the legs 10 to move in a substantially vertical plane whereby when the base is resting upon a floor having an irregular surface, each of the legs may be firmly seated upon the surface even though the legs may be disposed in different horizontal planes.

Referring more particularly to the material of which braces 12 may be suitably formed, I have found that excellent results are obtained by using sheets of low carbon steel 0.04 inch thick, with the strengthening effect of flanges 14, provide sufficient rigidity, together with the required degree of elasticity for ordinary purposes, to make a satisfactory brace which will function in the desired manner.

It will be apparent that space must be provided for vertical movement of the legs, particularly when they are used in connection with rigid supported objects of the character herein illustrated, if the object is to remain substantially in its normal horizontal position. For this purpose the invention provides mounting means comprising elements 16 of packed fibrous or other suitable material disposed on the leg connecting braces 12 and adapted to spacedly secure the supported object to the base by means of bolts 18. The mounting members may be of any suitable thickness or length provided they are shorter than the connecting braces upon which they are carried to thus leave between the base and the supported object a space for vertical movement of the legs at the corner of the base to which the legs are attached. Thus the mounting members 16 permit movement of the base to conform to various irregularities in a floor surface and at the same time permit the supported object to remain stable and substantially in its normal horizontal position without regard to the irregularities in the floor.

The spacing or mounting elements 16 may be of negligible length and of considerable thickness, in which event the base is capable of considerable movement and the legs may vertically move to a relatively great extent or conversely, spacing elements, which are relatively long and thin, permit a limited movement of the base and vertical movement of the legs. It will be apparent that no critical dimensions for these spacing or mounting elements can be given for general application, but the size of the spacers, as well as the size of the braces and the general arrangement of the base, is governed by the character and weight of the specific object with which the base is used and the relative degree of the irregularities in the floor surface expected to be encountered. The most efficient sizes for the spacer connecting elements may be readily determined by experimentation in each specific instance with the object of permitting a maximum movement of the base without interfering with the stability of the supported object and having in mind the degree of the irregularities expected to be encountered in the floor surface.

The following may be helpful in determining most desirable sizes in any given situation. If the spacer consists of a block one inch long and one inch thick and the brace is 24 inches long, the latter is free to flex a length of 11½ inches on either side of the spacer and any given leg may be upwardly moved a vertical distance of one inch. In this case, however, there may be some springiness in the base resulting in instability of the supported object. If the one inch spacer is lengthened to six inches, the brace is free to move through a length of but 9 inches on either side of the spacer and there is a further stiffening effect of the spacer on the contacting portion of the brace so that such contacting portion is held practically motionless and acts as a lever against movement of portions of the brace immediately beyond the spacer. In such an instance, springiness in the base is reduced so as to be practically imperceptible under ordinary conditions, while there is still permitted the necessary compensation for irregularities in the surface of the ordinary floors. Thus, the mounting members are preferably greater in length than in height.

Figure 4 illustrates another form of the invention as applied to another object, such as a rigid table top indicated at B, and herein the legs 20 are relatively long and instead of being of solid construction may be V-shaped in transverse cross-section and joined at their upper ends to the interconnecting braces 22 in the manner disclosed in my prior Patent No. 1,978,650, or in any other suitable manner. The spacer mounting elements 24 are disposed intermediate the ends of the braces 22 and screws 26 or the like are driven through the brace 22, the spacer elements 24 and the supported object B to securely mount the support upon the base. The operation and use of the form of the invention illustrated in Fig. 4 is the same as the form previously illustrated and described.

In Figure 5, the base illustrated in Figs. 1, 2 and 3 has been selected to exemplify the operation of all forms of bases embodying the principles of the present invention. To more clearly illustrate this operation, whereby relative vertical movement of the various legs are provided for to compensate for irregularities in the floor surface, the base in Fig. 5 is shown as removed from its supported object. For the purpose of illustration, let us assume that the floor upon which the base is placed is provided with a protuberance upon which rests the leg 10 of the upper left-hand corner or, more particularly, the leg indicated by the legend 4. It will be readily appreciated that bases of prior art constructions in such a situation would have at least one leg thereof held spaced from the floor which will result in an undesirable and annoying rocking of the base and accompanying movement of the supported object out of its normal plane. In the base of the present invention, however, the arrangement is such that each of the legs will move vertically to compensate for the upward movement of one of the legs so that each of the legs will rest on the floor and fulfill its intended function of bearing its portion of the weight of the base and its supported object. Thus, when the leg 10 in the upper left-hand corner indicated by the legend 4, is forced vertically upward by the protuberance on the floor surface, each of its adjacent braces 12 will pivot upon its spacer 16 to force the legs indicated by legends 1 and 3 carried at opposite ends of the braces 12, in a downward direction. Correspondingly, downward movement of the legs indicated by legends 1 and 3 will result in a pivotal movement of the remaining braces 12 which carry the leg indicated by the legend 2 to force this leg upwardly. The action is such that there is an opposed or reciprocal movement of adjacent legs in a substantially vertical direction and when any one of the legs is forced out of its normal plane by an irregularity in the floor surface, the normal extent of the vertical movement of the remaining legs is sufficient to collectively compensate for the vertical movement of the first leg. For example, if the leg indicated by the legend 4 is forced upwardly, the legs in legends 1 and 3 would be forced downwardly and the leg of legend 2 would be forced upwardly each substantially a third of the distance of the vertical movement of legend leg 4.

Figs. 6, 7 and 8 illustrate another form of the invention which may be attached to the side of an object such as here indicated generally at C. Referring particularly to Fig. 6, the base illustrated therein is formed of a series of rigid tubular braces 28 which have their adjacent ends hingedly connected. In the preferred construction illustrated, the legs 30 are rigidly attached to or may be formed integral with housing portions 32 which are adapted to receive adjacent ends of the tubular braces 28 for pivotal connection therewith as at 34. Braces 28 are pivotally attached to the supported object C at portions of the braces intermediate its legs 30 by means of screws, or the like, 36, and to provide for freedom of movement of the base with respect to the object, spacer elements 38 are disposed between the braces 28 and the support C.

The operation of the base illustrated in Figs. 6, 7 and 8 is identical with the operation of the forms of bases illustrated in the preceding figures and illustrates that the principles of the invention may be employed in bases which may horizontally support an object as well as bases which are adapted to be disposed beneath the object. It is understood, however, that the base of Fig. 6 is not limited in its application to the particular supported object indicated at C nor to horizontal connection to any other object, but may be substituted for the bases shown in Figs. 1 to 4. In such event, however, the base must necessarily be spaced vertically rather than horizontally from the supported object.

It will be readily understood that the resilient nature of the braces 12 and 22 in Figs. 1 to 3 and 4, respectively, permits the necessary relative vertical movement of the legs so that the legs 10 or legs 20 may be rigidly attached to their respective braces whereas with the rigid braces 28 of Figs. 6 to 8, the legs 30 must be resiliently attached thereto as by the hinges or pivots 32 and 34. However, whether the braces be resilient with rigidly attached legs or rigid with resiliently attached legs, the legs are flexibly interconnected by the braces so that the action of the base is substantially the same as described in connection with Fig. 5.

Herein have been particularly illustrated and described three relatively extreme forms of constructions embodying features of the present invention so as to render it readily apparent that the principles of the invention are applicable to a great variety of specific constructions and not merely to the forms which have herein been selected for exemplification.

I claim as my invention:

1. A base, legs for said base, braces flexibly interconnecting said legs so that each leg is capable of opposed movement relative to adjacent legs in a substantially vertical direction, an object supported by said base, and means disposed between the object and portions of the braces intermediate their connections with said legs for spacedly mounting the object upon the base.

2. A base having legs, leg braces flexibly interconnecting said legs so that each leg may move relative to adjacent legs in a substantially vertical direction whereby one leg may rest in a different horizontal plane from other legs, and means carried by portions of the braces intermediate their connections with said legs for spacedly mounting an object upon the base.

3. A base having legs capable of opposed movement relative to adjacent legs in a substantially vertical direction, braces extending between and interconnecting said legs, an object supported by said base, and means disposed between the object and an intermediate portion of said braces for spacedly mounting the object upon the base, said means serving as pivot points for pivotal movement of said braces with respect to the object whereby when one of the legs is forced out of its normal plane by an irregularity in a supporting floor surface the reciprocal movement of adjacent legs carried by the opposed ends of said braces is sufficient to compensate for the movement of the first leg so that the normal position of said object is not substantially affected.

4. A base, legs for said base, resilient braces flexibly interconnecting said legs so that each leg is capable of opposed vertical movement relative to adjacent legs in a substantially vertical direction, an object supported by said base, and spacer blocks of greater width than height disposed between the object and intermediate portions of said braces for spacedly mounting the object upon the base.

5. A base having legs, resilient braces flexibly interconnecting said legs for relative movement with respect to each other whereby one leg may rest in a different horizontal plane from other legs, and spacer blocks of greater width than height carried by said braces intermediate their ends for spacedly mounting an object upon said base.

6. A base having legs capable of opposed movement relative to adjacent legs in a substantially vertical direction, braces extending between and interconnecting said legs, and means carried by said braces between the ends thereof for spacedly mounting an object upon the base, said means serving as pivot points for pivotal movement of said braces with respect to the object whereby when one of the legs is forced out of its normal plane by an irregularity in a supporting floor surface the reciprocal movement of adjacent legs carried by the opposed ends of said braces is sufficient to compensate for the movement of the first leg so that the normal position of said object is not substantially affected.

7. A base having legs capable of opposed movement relative to adjacent legs in a substantially vertical direction, rigid braces extending between and hinged to said legs to interconnect the legs, an object supported by said base, and means disposed between the object and an intermediate portion of said braces for spacedly mounting the object upon the base, said means serving as pivot points for pivotal movement of said braces with respect to the object whereby when one of the legs is forced out of its normal plane by an irregularity in a supporting floor surface the reciprocal movement of adjacent legs carried by the opposed ends of said braces is sufficient to compensate for the movement of the first leg so that the normal position of said object is not substantially affected.

8. A base having legs capable of opposed movement relative to adjacent legs in a substantially vertical direction, resilient braces extending between and rigidly secured to said legs to interconnect the legs, an object supported by said base, and means disposed between the object and an intermediate portion of said braces for spacedly mounting the object upon the base, said means serving as pivot points for pivotal movement of said braces with respect to the object whereby when one of the legs is forced out of its normal plane by an irregularity in a supporting floor surface the reciprocal movement of adjacent legs carried by the opposed ends of said braces is sufficient to compensate for the movement of the first leg so that the normal position of said object is not substantially affected.

RANDOLPH W. SHANNON.